US008870230B2

(12) United States Patent
Bibbo

(10) Patent No.: US 8,870,230 B2
(45) Date of Patent: Oct. 28, 2014

(54) SINGLE USE WALL PASS-THROUGH SYSTEM

(71) Applicant: NewAge Industries, Inc., Southampton, PA (US)

(72) Inventor: Keneth Bibbo, Freehold, NJ (US)

(73) Assignee: NewAge Industries, Inc., Southampton, PA (US)

( * ) Notice: Subject to any disclaimer, the term of this patent is extended or adjusted under 35 U.S.C. 154(b) by 0 days.

(21) Appl. No.: 13/853,392

(22) Filed: Mar. 29, 2013

(65) Prior Publication Data

US 2013/0257039 A1 Oct. 3, 2013

Related U.S. Application Data

(60) Provisional application No. 61/617,941, filed on Mar. 30, 2012.

(51) Int. Cl.
*F16L 5/00* (2006.01)
*F16L 5/02* (2006.01)

(52) U.S. Cl.
CPC ........................................ *F16L 5/02* (2013.01)
USPC ..................................... 285/139.3; 285/139.1

(58) Field of Classification Search
USPC ........ 285/142.1, 139.1, 139.2, 139.3; 422/33, 422/295
See application file for complete search history.

(56) References Cited

U.S. PATENT DOCUMENTS

| 1,062,015 | A | * | 5/1913 | Lane | 285/139.1 |
| 1,989,614 | A | * | 1/1935 | Halpern et al. | 285/139.1 |
| 2,198,535 | A | * | 4/1940 | James | 285/139.1 |
| 2,413,308 | A | * | 12/1946 | Stanfield | 285/142.1 |
| 2,793,830 | A | * | 5/1957 | Nakaj et al. | 285/140.1 |
| 3,275,347 | A | * | 9/1966 | Scott | 285/139.3 |
| 3,351,361 | A | * | 11/1967 | Martin | 285/139.1 |
| 3,649,054 | A | * | 3/1972 | McClenan | 285/149.1 |
| 4,071,265 | A | | 1/1978 | Wallace | |
| 4,194,765 | A | | 3/1980 | Reddy | |
| 4,252,348 | A | * | 2/1981 | Kojima | 285/142.1 |
| 4,281,422 | A | * | 8/1981 | Simonelli | 138/89.1 |
| 4,593,940 | A | * | 6/1986 | Wilder | 285/142.1 |
| 4,828,296 | A | * | 5/1989 | Medvick | 285/139.1 |
| 5,290,071 | A | * | 3/1994 | Rider et al. | 285/139.1 |
| 5,345,813 | A | | 9/1994 | Flessas | |
| 5,505,499 | A | * | 4/1996 | Wallbank | 285/139.1 |
| 5,562,882 | A | | 10/1996 | Smith et al. | |

(Continued)

FOREIGN PATENT DOCUMENTS

EP 0117821 9/1984

*Primary Examiner* — David E Bochna
(74) *Attorney, Agent, or Firm* — Volpe and Koenig, P.C.

(57) ABSTRACT

A single use wall pass-through system having first and second fixed wall parts attached through an opening in a wall, each including a tubular body and a mounting flange for connection to the wall. A connection is located at facing ends of the tubular bodies to allow them to be connected together within the wall that allows adjustability to compensate for the various thicknesses of walls. The fixed wall parts further include clamping flanges used to provide a sealed connection between one or both of the fixed wall parts and the hose or tube which carries the material from an outside area into another area defined on the inside of the wall. A gasket is used here along with a clamp plate for connection to the clamping flange via a clamping ring. The transfer hose and the gasket are disposable. The clamp ring and clamp plate can be re-used.

17 Claims, 8 Drawing Sheets

(56) References Cited

U.S. PATENT DOCUMENTS

| | | | |
|---|---|---|---|
| 5,722,699 A * | 3/1998 | Brancher | 285/142.1 |
| 5,803,513 A | 9/1998 | Richardson | |
| 5,921,589 A | 7/1999 | Dubois | |
| 5,967,567 A * | 10/1999 | Nordstrom | 285/139.1 |
| 5,971,444 A * | 10/1999 | Hawkins | 285/139.2 |
| 6,183,021 B1 * | 2/2001 | Walsh et al. | 285/139.2 |
| 6,883,836 B2 * | 4/2005 | Breay et al. | 285/145.4 |
| 7,712,789 B2 * | 5/2010 | Heuer et al. | 285/139.1 |
| 7,758,084 B2 * | 7/2010 | Boudry et al. | 285/139.3 |
| 2004/0094951 A1 | 5/2004 | Sigrist et al. | |

* cited by examiner

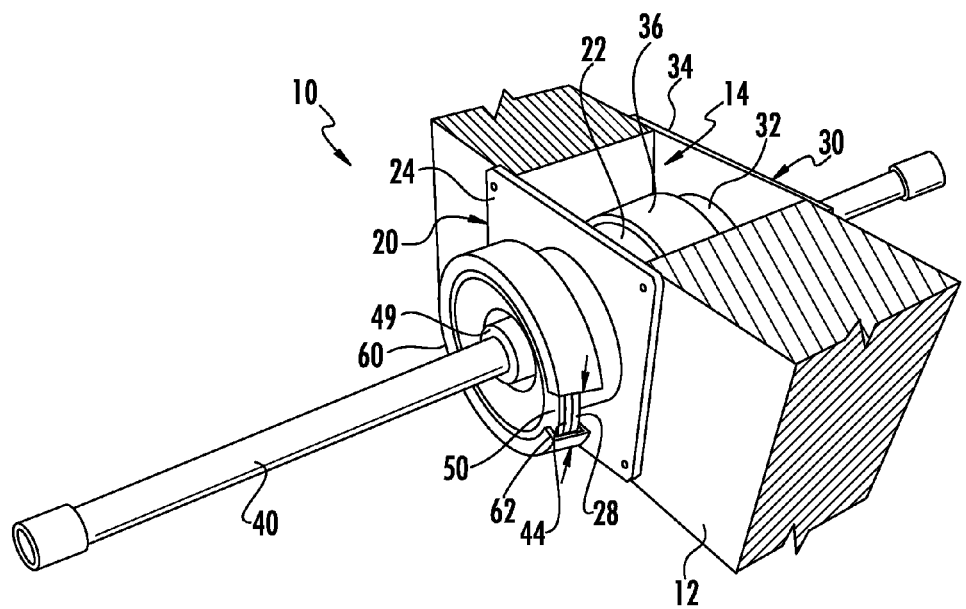
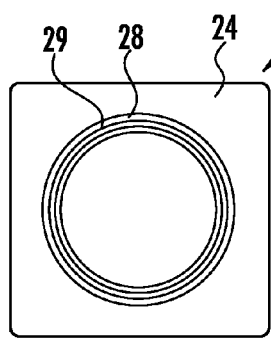
FIG. 3
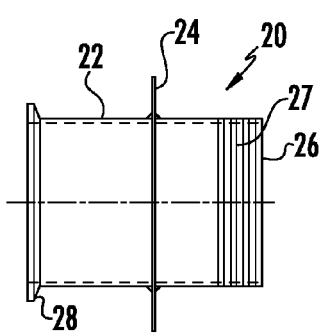
FIG. 2
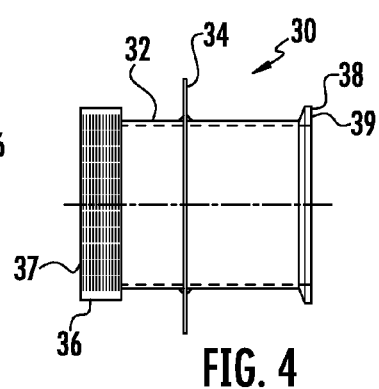
FIG. 4

SINGLE USE WALL PASS-THROUGH SYSTEM

INCORPORATION BY REFERENCE

The following documents are incorporated herein by reference as if fully set forth: U.S. Provisional Application No. 61/617,941, filed Mar. 30, 2012.

BACKGROUND

In chemical, bio, and pharma processing, it is often necessary to deliver a liquid product or agent from a transport or "dirty" processing area to a "clean" area in which processing of the materials takes place. This often involves the use of a wall pass-through in which a tube or hose carrying a liquid chemical, bio, or pharma product must pass through a wall into the clean room and then the tube or hose sealed against the wall opening so that no potentially hazardous material escapes from the clean room through the wall opening once processing begins. This can also be used to keep contaminants from entering the clean room. Further, this can also be used to maintain the integrity and HVAC balance of either room and prevent migration of particulates from one room to another.

The prior known systems involve a series of tubes, fitments, clamps and gaskets which must typically be cleaned after use. It would be desirable to provide a simple, disposable system for transferring products from an outside area into a clean processing room through a wall pass-through which eliminates the need for cleaning at least the components in contact with the materials, while still providing a secure and sealed connection between a clean room separated by a wall from an outside environment and the outside environment.

SUMMARY

The present invention provides a single use wall pass-through system. The system includes first and second fixed wall parts which can be attached through an opening in a wall, with each of the wall parts including a tubular body and a mounting flange for connection to the wall. A connection is located at the facing ends of the tubular bodies to allow the first and second wall parts to be connected together within the wall. This can be done with a threaded connection using a sleeve or can be a coupling arrangement with an overlapping sliding fit which uses a pair of o-rings, or a sealant or adhesive in order to connect the tubular bodies together. The mounting flanges mount to the respective sides of the wall around the opening. The fixed wall parts allow adjustability to compensate for the various thicknesses of walls. Each of the fixed wall parts further includes a clamping flange which is used in order to provide a sealed connection between one or both of the fixed wall parts and the hose or tube which carries the material from an outside area into another area defined on the inside of the wall. Here, a gasket is adhered or otherwise connected to the outside of the tube or hose. A clamp plate is located on an opposite side of the gasket from the clamping flange on the fixed wall part, and the single use hose or tube is passed through the tubular bodies of the fixed wall part. The gasket is then clamped between the clamping flange on one fixed wall part and the clamp plate and held in position using a clamp ring which is preferably a standard sanitary flange clamp. Once the gasket is sealed to the clamping flange, transfer of the material through the hose or tube can be carried out without any risk of leakage or contamination of the wall pass-through. When complete, the transfer hose or tube along with the gasket are disposed of, thus eliminating the need for cleaning. The clamp ring and clamp plate can be re-used in connection with a new hose/gasket assembly.

When not in use, solid end caps can be installed using the clamp rings on one or both of the clamping flanges of the fixed wall parts.

In one aspect of the invention, the hose or tube is made of silicone and the gasket is also made of silicone and adhered to the hose or tube using silicone material.

In another aspect of the invention, the hose or tube is a thermoplastic material and the gasket is chemically bonded or adhered to the hose or tube.

In one aspect of the invention, the coupling interface between the first and second fixed wall parts is a threaded connection including external threads on an outer portion of the tubular body of the first fixed wall part and a sleeve on the tubular body of the second fixed wall part which has internal threads which can be matingly engaged with the external threads on the tubular body of the first fixed wall part.

In another aspect, the tubular bodies of the fixed wall parts do not include threads and an outer sleeve is adhered to the outside of both tubular bodies in the interface area.

In another aspect, the tubular bodies of the fixed wall parts do not include threads but rather a pair of elastomeric o-rings set within the inside circumference of the outer body that are compressed by the outer circumference of the inner body, thus making an air-tight seal without the need for sealants or adhesives, if so desired.

In another aspect of the invention, the gasket can be provided with more than one opening so that two or more hoses or tubes can be passed through a single gasket. The clamp plate would also be provided with an appropriately large single opening or an appropriate number of openings in complementary positions to the openings in the gasket.

The gasket can be provided with clamping beads and the clamp plate and the clamping flange can have corresponding grooves. The gasket can alternatively be provided without a bead, and instead a clamping bead can be provided on one or both of the clamping flange or the clamp plate.

A method of connecting a hose through a single-use wall pass-through system is also provided, and includes the steps of (1) removing a clamp plate installed on a clean side of a wall pass-through chamber defined by first and second tubular bodies connected to clamping flanges that are attached on either side of a wall through an opening between the clean side and a dirty side, with the first and second tubular bodies being connected together in a sealed manner within the opening; (2) installing the tube through a hole or opening in a gasket on the clean side, such that the tube is connected to the clean side gasket in a sealed manner gasket; (3) placing an end of the tube which is closed off into an inside of the wall pass-through chamber; (4) re-installing the clean side clamp plate over the gasket on the tube on the clean side so that the end of the tube is sealed in the chamber; (5) pressurizing the chamber with process air from a process air source; (6) removing a clamp plate from the dirty side; (7) pulling the tube into the dirty side; (8) installing the tube 40 through a hole or opening in a gasket on the dirty side such that the tube is connected to the dirty side gasket in a sealed manner gasket; (9) re-installing the dirty side clamp plate over the gasket on the tube on the dirty side so that the end of the tube extends out through the dirty side gasket. It is noted that the re-installing of the clamp plates includes the possibility of re-installing the same clamp plate or a clamp plate having a different configuration.

In another aspect of the method, air filters are installed on inlet and outlet purge tubes connected to the first and second tubular bodies. It is also preferred to provide clean process air to at least the inlet purge tube prior to removing the dirty side clamp plate.

It is further preferred to wipe down the chamber with a cleaner and/or disinfectant after removal of the clean side clamp plate.

After transfer of material through the tube, preferably a clean side end of the tube is sealed, and the clean side clamp plate is removed. The tube and the clean side gasket are then placed in the chamber, and a sealed clamp plate is installed on the clean side of the wall pass-through chamber. This can be the same or a different clamp plate, and can be provided with a gasket. The dirty side clamp plate is then removed, and the tube along with the associated gasket(s) can be removed and discarded. A sealed clamp plate is then installed on the dirty side of the wall pass-through chamber.

BRIEF DESCRIPTION OF THE DRAWING(S)

The foregoing summary as well as the following detailed description will be better understood when reviewed in conjunction with the appended drawings.

In the drawings:

FIG. 1 is a perspective view of a single use wall pass-through system according to the invention.

FIG. 2 is a side view of a first fixed wall part used in the single use wall pass-through system shown in FIG. 1.

FIG. 3 is an end view of the first fixed wall part shown in FIG. 2.

FIG. 4 is a side view of a second fixed wall part used in the single use wall pass-through system shown in FIG. 1.

Figure 11:
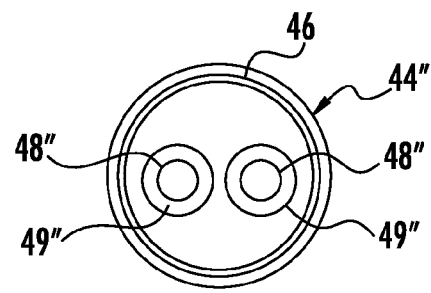

FIG. 11 was is an end view of an alternate embodiment of a gasket.

Figure 12:
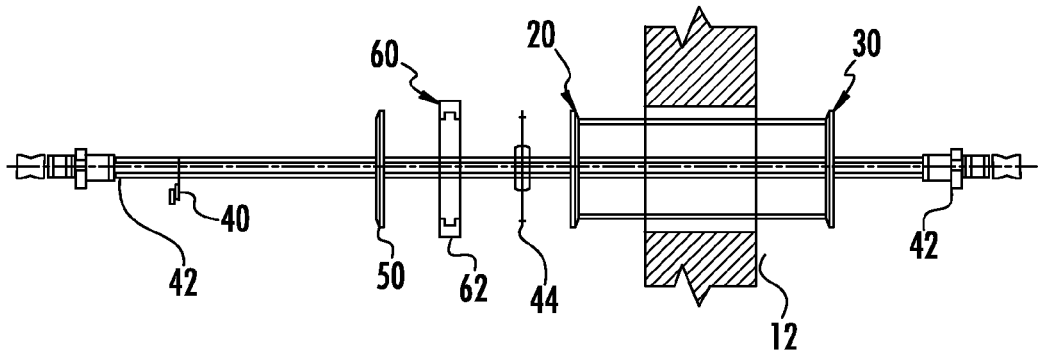

FIG. 12 is a schematic side view showing the installation of a hose or tube through the single use wall pass-through system.

Figure 13:
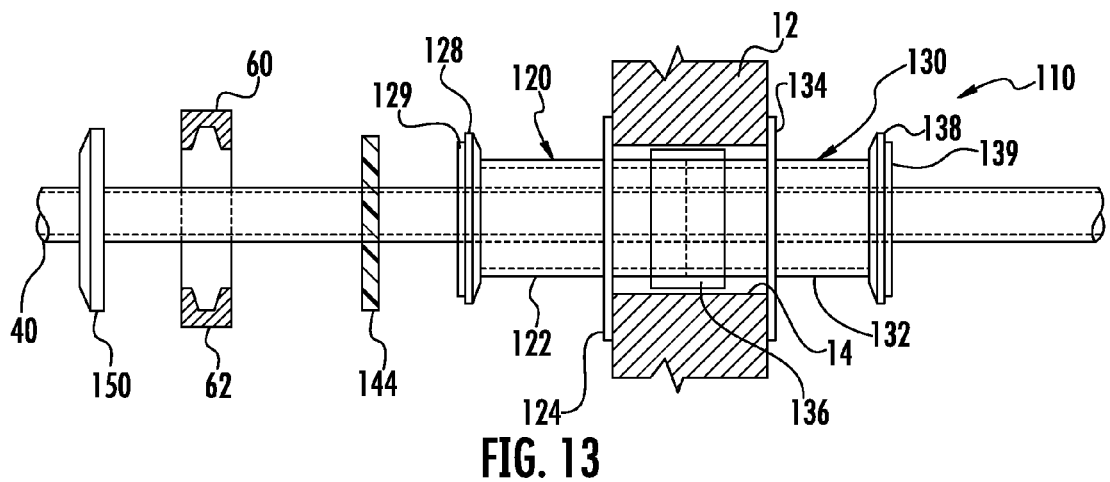

FIG. 13 is a schematic side view of an alternate embodiment of a single use wall pass-through system according to the invention.

Figure 14:
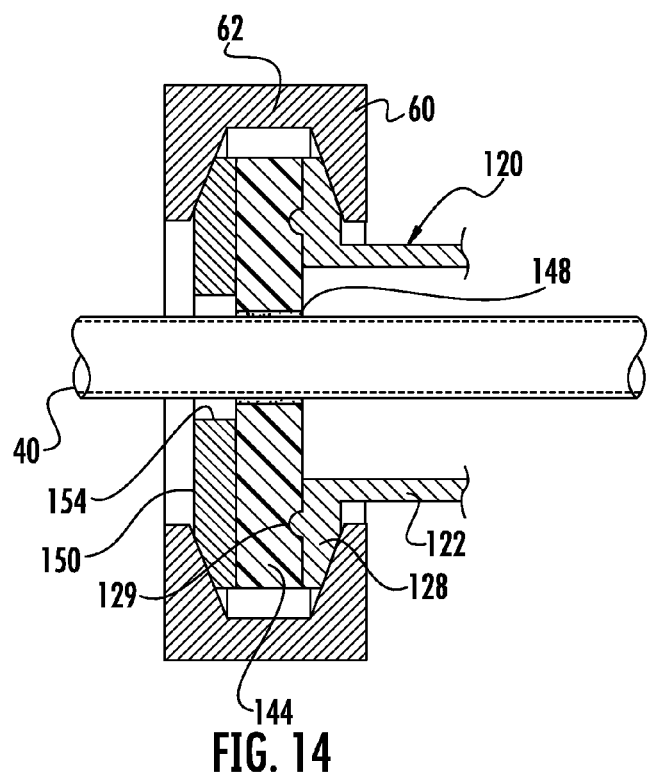

FIG. 14 is an enlarged cross-sectional view through the clamped gasket in the embodiment of FIG. 13.

Figure 15:
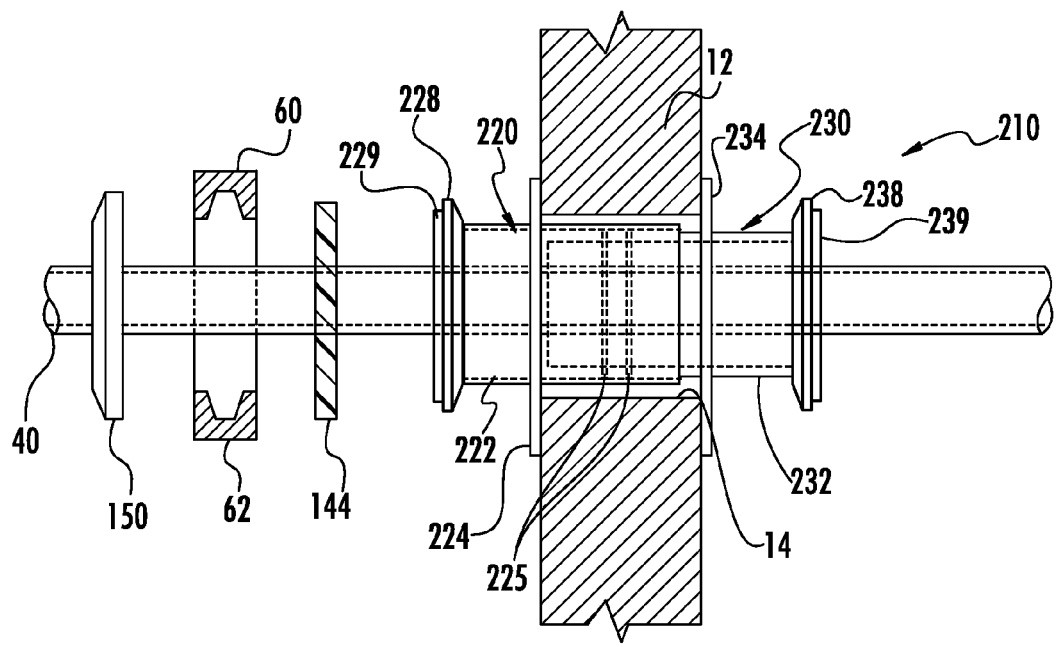

FIG. 15 is a schematic side view of a second alternate embodiment of a single use wall pass-through system according to the invention.

Figure 16:
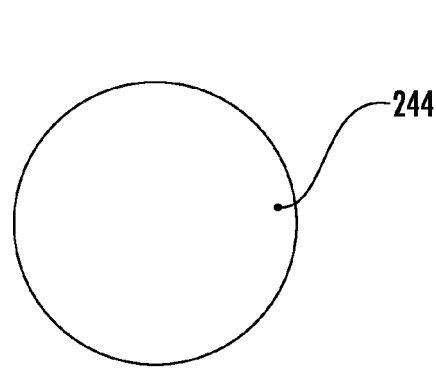

FIG. 16 is an end view of an alternate gasket made from sheet material for the wall pass-through systems of FIGS. 13 and 15.

Figure 17:
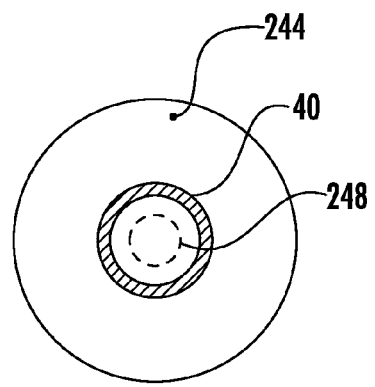

FIG. 17 is an end view of the gasket of FIG. 16, shown with a hose connected by an interference fit through an opening cut therein.

FIGS. 18-25 are a series of views of the single use wall pass-through system illustrating a method of use in order to prevent contamination in which the first and second fixed wall parts each include an additional side port for connecting a clean process air flow.

DETAILED DESCRIPTION OF THE PREFERRED EMBODIMENT

Certain terminology is used in the following description for convenience only and is not considered limiting. Words such as "top", "bottom", "left", and "right" indicate directions in the drawings to which reference is made, and are not considered limiting. This terminology includes the words specifically noted above and derivatives thereof and words of similar import. Additionally, the terms "a" and "one" are defined as including one or more of the referenced item unless specifically noted.

Referring to FIG. 1, a single use wall pass-through system 10 is shown. The pass-through system 10 is mounted through a wall 12, shown partially broken away, through an opening 14 defined in the wall 12.

Referring to FIGS. 1-4, the pass-through system 10 includes a first fixed wall part 20 having a tubular body 22 with a mounting flange 24 located thereon. A coupling interface 26 is located at a portion of the tubular body 22 that is adapted to be inserted into the opening 14 in the wall 12. As shown in FIG. 2, the coupling interface 26 on the first fixed wall part 20 can utilize external threads 27. Alternatively, the tubular body 22 does not require threads, and an alternate arrangement can be provided. A clamping flange 28 is located on the side of the first fixed wall part 20 that extends out from the wall 12. Preferably, the first fixed wall part 20 is made of stainless steel and is a welded assembly. Alternatively, it can be made from other materials, such as other types of metal or polymeric materials.

As shown in FIG. 3, preferably the clamping flange 28 includes a beveled edge on one side. A gasket groove 29 can be provided on the other side which is adapted to receive a bead located on the gasket, which is discussed in detail further below.

Referring to FIG. 4, the second fixed wall part 30 is shown in detail. The second fixed wall part 30 is similar to the first fixed wall part 20, and includes a tubular body 32 along with a mounting flange 34 for connection to the wall 12 around the opening 14. A coupling interface 36 is located on the tubular body 32 and preferably is in the form of a sleeve 37 having internal threads which are complementary to the external threads 27 on the first fixed wall part 20. Alternatively, no threads are required. A clamping flange 38 is located on the part of the second fixed wall part 30 that extends out from the wall 12. Preferably, the clamping flange 38 also includes a gasket groove 39 for receiving a bead on the gasket.

As shown in FIG. 1, the first and second fixed wall parts 20, 30 can be mounted to the wall 12 by inserting them into the opening 14 from opposite sides of the wall 12 and connecting them together via the coupling interface 26, 36 on the first and second fixed wall parts 20, 30 within the wall 12. In the embodiment shown using a threaded connection, the distance between the mounting flanges 24, 34 can be adjusted depending upon the depth of engagement of the threads 27 on the first fixed wall part in the sleeve 37 on the second fixed wall part 30. Alternatively, if no threads are provided on either the fixed wall parts 20, 30, the sleeve 37 would be unthreaded and would provide a slip fit between the first and second wall parts which can be sealed using an adhesive or sealant or with o-rings located around the circumference of the interface.

Figure 5:
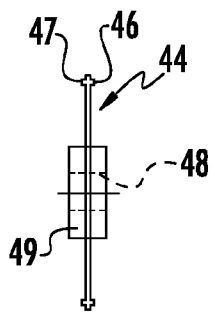
FIG. 5 is a side view of a gasket for the single-use wall pass-through system.
Figure 6:
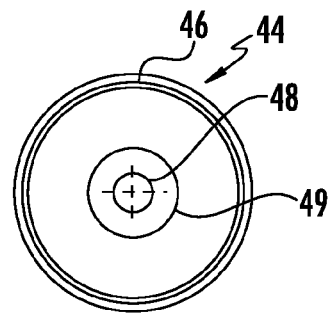
FIG. 6 is an end view of the gasket shown in FIG. 5.

Referring to FIGS. 5 and 6, a first embodiment of a gasket 44 is shown. Here the gasket 44 includes clamping beads 46, 47 that extend around the periphery on each side of the gasket 44. A center opening 48 is defined through the gasket 44 and is surrounded by a reinforcement 49. As shown in FIG. 1, the gasket 44 is preferably located on a hose or tube 40 that is extending through the wall pass-through. The hose or tube 40 is preferably made of silicone or a thermoplastic material and is a single use hose or tube for transferring material from one side of the wall 12, such as an outside corridor, to the other side of the wall 12, which can be a clean room or processing area. The gasket 44 is preferably made from silicone or a thermoplastic material, and is connected to the hose using silicone or an adhesive of chemical bond.

Figure 7:
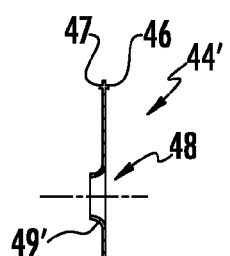
FIG. 7 is a side view of an alternate embodiment of a gasket for use in connection with the single use wall pass-through system shown in FIG. 1.
Figure 8:
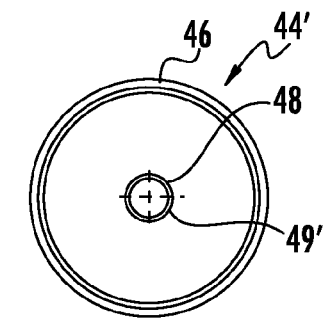
FIG. 8 is an end view of the gasket shown in FIG. 7.

Referring to FIGS. 7 and 8, a second embodiment of the gasket 44' is shown. Here the gasket 44' is the same as the gasket 44 except that the reinforcement 49' only extends in one direction from a surface of the gasket 44' and is not bonded or adhered to the hose or tube. This allows gasket 44' to move along the axis of the hose or tube and fit into the mating flange without stretching or compressing the hose or tube.

Figure 9:
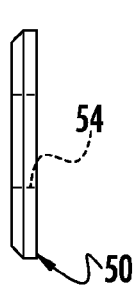
FIG. 9 is a side view of a clamp plate used in connection with the single use wall pass-through system shown in FIG. 1.
Figure 10:
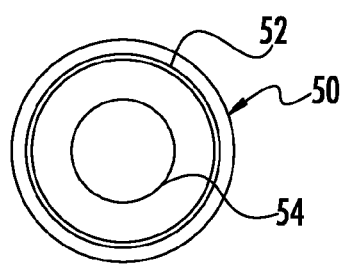
FIG. 10 is an end view of the clamp plate.

Referring to FIGS. 9 and 10, a clamp plate 50 is shown. The clamp plate 50 preferably has the same shape as the clamping flange 28, 38 on one or both of the fixed wall parts 20, 30. This includes a beveled edge around the periphery on one side, as well as a gasket groove 52 on the opposite side which is adapted to receive a clamping bead 46, 47 on one side of the gasket 44. A least one opening 54 is provided which is large enough to accommodate the reinforcement 49 on the gasket 44. The opening 54 can be circular or slotted to allow the insertion of the clamp plate 50, without having to thread the tube end 40, or the fitting 42 therethrough. More than one opening 54 could be provided, depending upon the gasket configuration and the number of hoses or tubes 40 that are to be passed through the wall pass-through.

Referring to FIG. 12, the installation of a hose or tube 40 through the wall pass-through system 10 is shown in detail. Here a gasket 44 has been bonded or adhered to the hose or tube 40 and the gasket 44 is aligned so that the clamping bead 46 on one side of the gasket is received at least partially within the gasket groove 29 on the clamping flange 28 of the first fixed wall part 20. The clamp plate 50, which has been placed over the hose or tube 40, is aligned with the clamping flange 28 with the gasket 44 located therebetween, and the clamping bead 47 on the opposite side of the gasket 44 being at least partially received within the gasket groove 52 of the clamping plate 50. A clamp ring 60, shown in FIGS. 1 and 12 is then placed around the clamping flange 28, the gasket 44 and the clamping plate 50 and tightened. The clamp ring 60 has a channel-shaped cross-section having inside bevels which are adapted to force the clamping plate 50 against the clamping flange 28 via contact with the bevels located on the opposite sides of the clamp plate 50 and the clamping flange 28. The clamp ring 60 is a standard sanitary flange clamp and can be tightened via a threaded coupling represented only schematically via arrows shown in FIG. 1 in order to tighten the clamp ring 60. The channel-shaped cross-section 62 of the clamp ring 60 is shown most clearly in FIG. 12 and the bevels on the back side of the clamping plate 50 and the clamping flange 28 are shown most clearly in FIGS. 9 and 2, respectively.

Once installed, material can then be transferred through the hose or tube 40 from outside of the wall 12 to an inside of the wall 12 without the risks of any materials, which could be contaminants or hazardous materials, escaping from one side of the wall 12 to the other side of the wall 12. After transfer of the material and any processing within the clean room or other area delimited via the wall 12 is completed, the tube 40 and gasket 44 can be removed and discarded.

Referring to FIG. 11, an alternate configuration for the gasket 44" is shown. Here two openings 48" are shown having reinforcements 49". Alternate gasket arrangements can be provided allowing multiple tubes or hoses 40 to be passed through the opening 14 in the wall 12 when multiple materials are being used or required for processing.

Referring to FIGS. 13 and 14, another embodiment of the pass-through system 110 is shown and includes a first fixed wall part 120 having a tubular body 122 with a mounting flange 124 located thereon. A clamping flange 128 is located on the side of the first fixed wall part 120 that extends out from the wall 12. The clamping flange 128 includes an annular bead 129 extending outwardly therefrom for clamping into a flat gasket 144, described in detail below. Preferably, the first fixed wall part 120 is made of stainless steel and is a welded assembly. Alternatively, it can be made from other materials, such as other types of metal or polymeric materials.

As shown in FIG. 14, preferably the clamping flange 128 includes a beveled edge on one side similar to the flange 28 above to generate an axial force as the clamping band 60 is tightened.

Still with reference to FIG. 12, the second fixed wall part 130 is shown in detail. The second fixed wall part 130 is similar to the first fixed wall part 120, and includes a tubular body 132 along with a mounting flange 134 for connection to the wall 12 around the opening 14. A coupling 136 is located on the tubular body 132 for coupling to the first fixed wall part 120. A clamping flange 138 is located on the part of the second fixed wall part 30 that extends out from the wall 12. Preferably, the clamping flange 138 includes an annular bead 139 extending outwardly therefrom for clamping into a flat gasket 144, if desired, in a similar manner shown for the clamping flange 128.

The first and second fixed wall parts 120, 130 are mounted to the wall 12 by inserting them into the opening 14 from opposite sides of the wall 12 and connecting them together via the coupling 136, which can be a slip fit coupling, with an adhesive or sealant provided between the coupling 136 and the tubular bodies 122, 132.

Still with reference to FIGS. 13 and 14, in the embodiment 110, the gasket 144 is formed of flat sheet material. A center opening 148 is defined through the gasket 144. The flat sheet material is thick enough that no reinforcement is required, and the flat sheet material can be easily cut and/or punched to make form the desired gasket to allow one, two or more hoses or tubes 40 to be accommodated. The hose or tube 40 is preferably made of silicone or a thermoplastic material and is a single use hose or tube for transferring material from one side of the wall 12, such as an outside corridor, to the other side of the wall 12, which can be a clean room or processing area. The gasket 144 is preferably made from silicone or a thermoplastic flat sheet material, and is connected to the hose 40 using silicone or an adhesive of chemical bond.

During clamping, the annular bead 129 on the flange 128 is pressed into the flat gasket material and forms a tight seal upon clamping of the clamping plate 150 against the clamping flange 128 using the clamp 60. Optionally, a bead similar to the bead 129 can be provided on the clamping plate 150.

This arrangement 110 is economical for the production of the single use system components since no molding of the gasket 144 is required as it can be punched or cut from sheet material. Further, this embodiment can be used in connection with larger sized openings, for example, 12 inch diameter or larger tubular bodies 122, 132.

Referring to FIG. 15, another embodiment of the pass-through system 210 is shown and includes a first fixed wall part 220 having a tubular body 222 with a mounting flange 224 located thereon. A clamping flange 228 is located on the side of the first fixed wall part 220 that extends out from the wall 12. The clamping flange 228 includes an annular bead 229 extending outwardly therefrom for clamping into a flat gasket 144, as described above. Preferably, the first fixed wall part 220 is made of stainless steel and is a welded assembly. Alternatively, it can be made from other materials, such as other types of metal or polymeric materials. The clamping flange 228 includes a beveled edge on one side similar to the flange 28, 128 above to generate an axial force as the clamping band 60 is tightened.

Still with reference to FIG. 15, the second fixed wall part 230 is shown in detail. The second fixed wall part 230 is similar to the first fixed wall part 220, and includes a tubular body 232 along with a mounting flange 234 for connection to the wall 12 around the opening 14. The tubular body 232 has a smaller outside diameter than the inside diameter of the tubular body 222 to allow a slip fit therein. A clamping flange 238 is located on the part of the second fixed wall part 30 that extends out from the wall 12. Preferably, the clamping flange 238 includes an annular bead 239 extending outwardly therefrom for clamping into a flat gasket, if desired, in a similar manner shown for the clamping flange 228.

The tubular bodies 222, 232 are not threaded and sized so that one slips inside the other, and a pair of elastomeric o-rings 225 are located inside the tubular body 222 on its inner circumference, or in grooves specifically provided for the o-rings 225, and the 0-rings 225 are compressed by the outer circumference of the inner tubular body 232 as the tubular bodies 222, 232 are slid together, making an air-tight seal without the need for sealants or adhesives.

The gasket 144 with the center opening 148 can be used in the arrangement 210 in a similar manner to the arrangement 110 as discussed above. Installation and clamping are the same as discussed above in connection with the arrangement 110. Once the material transfer is complete, the single use hose or tube 40 and the gasket 144 are disposed of.

Referring to FIGS. 16 and 17, an alternate gasket 244 for use with the arrangements 110, 210 discussed above is provided. The gasket 244 is preferably made from silicone or a thermoplastic flat sheet material, and is connected to the hose 40 only by an interference fit. This provides a reduced cost since the gasket 244 can just be cut from sheet material, as shown in FIG. 16, and then an undersized hole 248 is cut, represented in dashed lines in FIG. 17, and the tube 40 is forced through the hole, providing an interference fit due to the resilient property of the sheet material. This eliminates the need for adhesives in order to connect to the tube 40.

The gasket 244 can also be used in the form shown in FIG. 16, without any hole 248 cut therein, in which case the arrangements 110, 201 could just be used as a sealed wall pass-through chamber by keeping a the uncut gasket 244 in place on one side as any materials to be passed into or out of the clean room are loaded, and then a cover formed by another gasket 244 is placed on the open, loading side prior to the other gasket 244 being removed from the unloading side. This allows additional functionality for these arrangements in an extremely cost effective manner.

Figure 18:
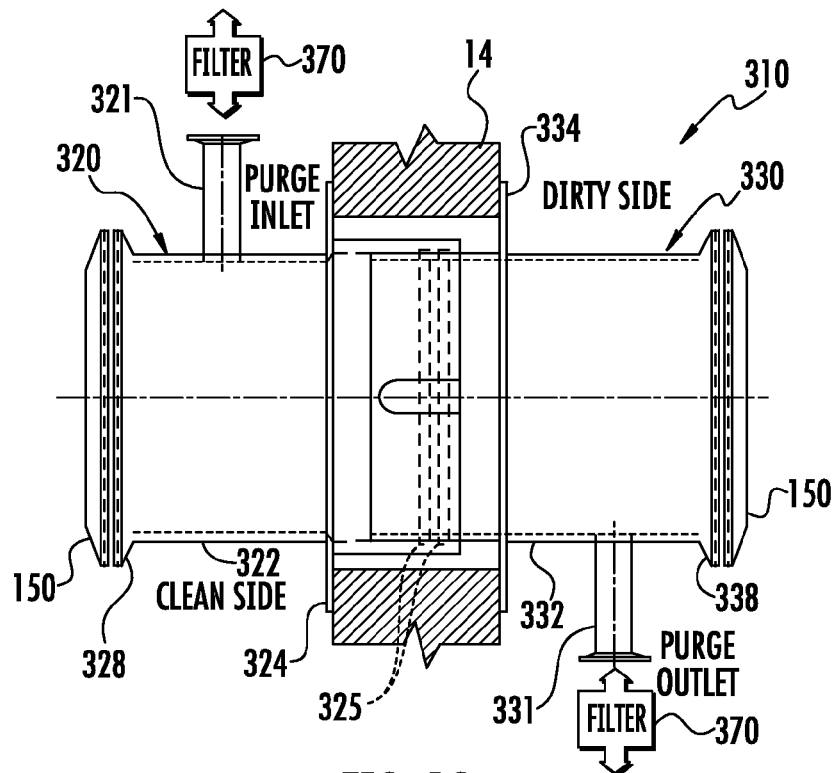

Referring now to FIGS. 18-25, a method for use of the single use wall pass-through system is shown with a further embodiment of the system 310, which includes an optional purge connection. As shown in FIG. 18, the system 310 is similar to the system 210 discussed above, and includes the first fixed wall part 320 and the second fixed wall part 330 with the tubular bodies 322, 332 and wall flanges 324, 334 for attachment on both sides of an opening in a wall 14. O-rings 325, which are similar to the O-rings 225 above, are used to seal the first and second fixed wall parts 320, 330 together. Here, an inlet purge tube 321 is connected to the first tubular body 322 and an outlet purge tube 331 is connected to the second tubular body 332. The inlet and outlet purge tubes 321, 331 allow process air to be carried into and from the enclosed area to allow connections to be made without contamination traveling from the "Clean Side" to the "Dirty Side" of a clean room wall. The inlet and outlet purge tubes preferably have air filters 370 connected at the openings on in-line with the process air connections. Clamping flanges 328, 338 are located at the respective ends for attachment of clamp plates 150 and associated gaskets 44, 144, 244. The clamps 60 are not shown for clarity.

Figure 19:
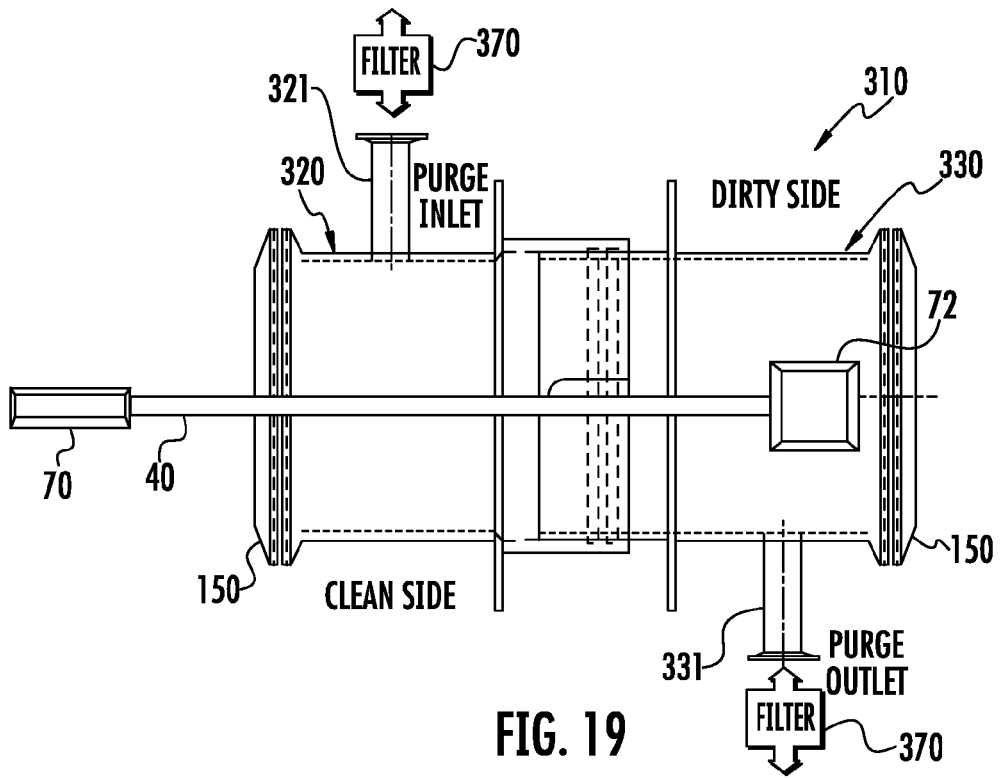

A process for installing a tube 40 through the single use wall pass-through system 310 starts with the system 310 in the closed-off state as shown in FIG. 18. Here, the clamp plates 150 are solid plates preferably installed with a non-perforated gasket 144, as discussed above, or can be clamp plates 150 with openings that are installed with a non-perforated gasket 244. Purge inlet and outlet air filters 370 are installed. These filters 370 are preferably 1 micron filters. The clean side end cap 150 and gasket 244 are removed and the interior of the system, defined by the tubular bodies 322, 332, is wiped down with a cleaner and/or disinfectant, such as alcohol. Referring to FIG. 19, the tube 40 is installed through a hole cut in the gasket 244 with an interference fit, or one of the other gaskets 44, 144 above, and the end of the tube 40, which is closed off with a cap 72, is placed into the inside of the pass-through system 310. The clamp plate 150 is re-installed and clamped in place on the Clean Side. Preferably, the tube 40 is also closed off with a cap 70 on the Clean Side.

Figure 20:
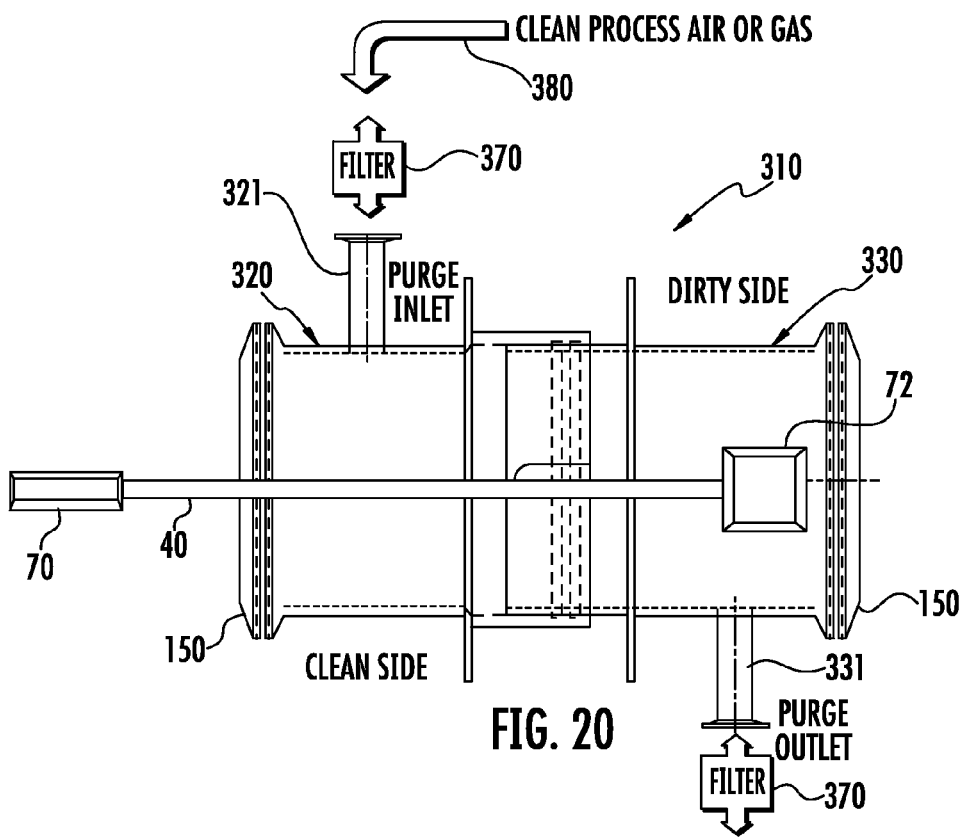

Referring now to FIG. 20, the sealed chamber in the pass-through system 310 is now pressurized with process air from a process air source 380. The Dirty Side end cap 150 and any associated gasket 244 I then removed. The process air flow ensures that any air flow is outward into the Dirty Side.

Figure 21:
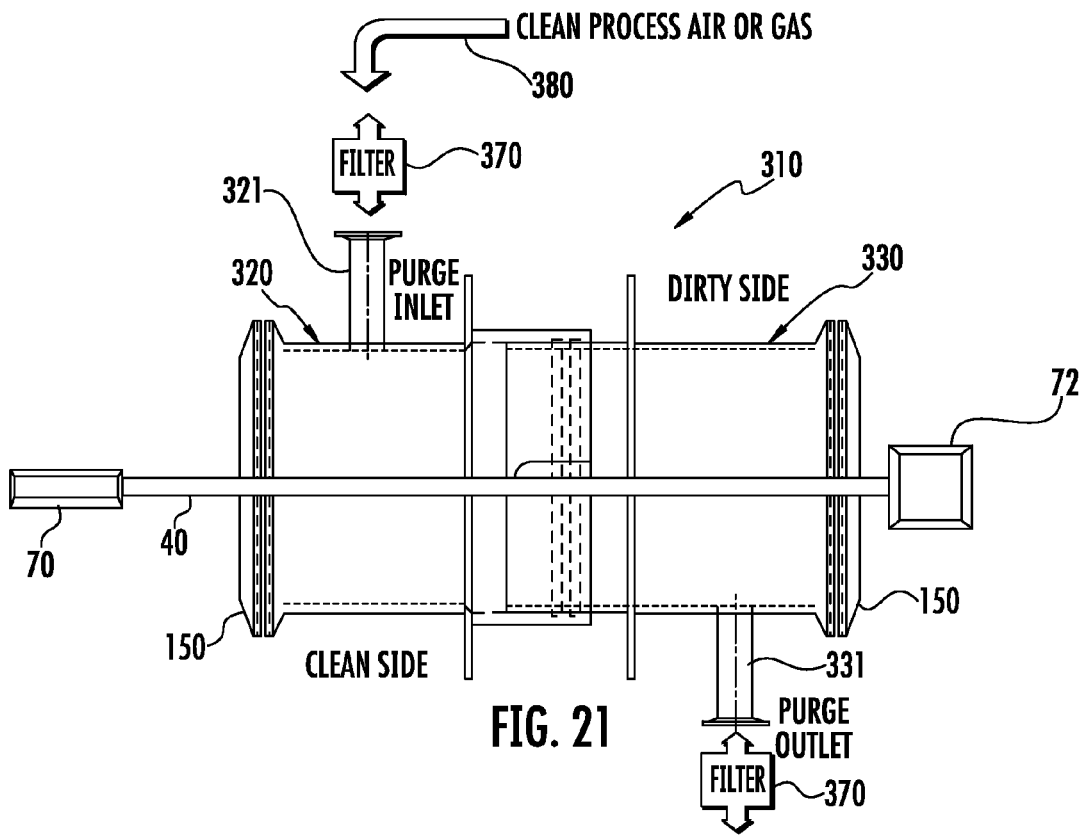

As shown in FIG. 21, the tube 40 is now pulled into the Dirty Side, where a seal or gasket 244, 144, 44 is attached to the tube 40 and a clamp plate 150 is then re-installed and clamped in position so that the Dirty Side is again closed, with the tube 40 and end cap 72 extending through the pass-through system 310.

Figure 22:
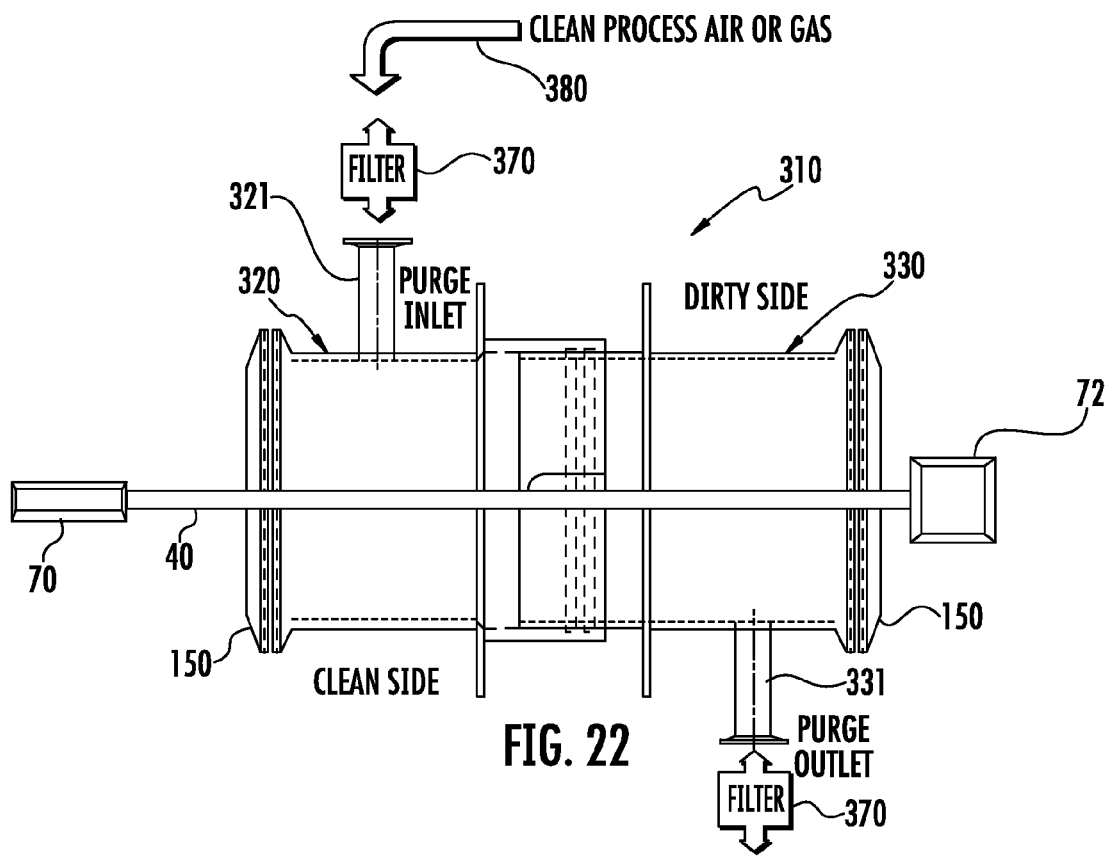

FIG. 22 shows the tube 40 extending through the pass-through system 310 now ready to use to transfer material through the tube 40 from the Clean Side to the Dirty Side or vice versa. Here, the process air source 380 can optionally be turned off.

Figure 23:
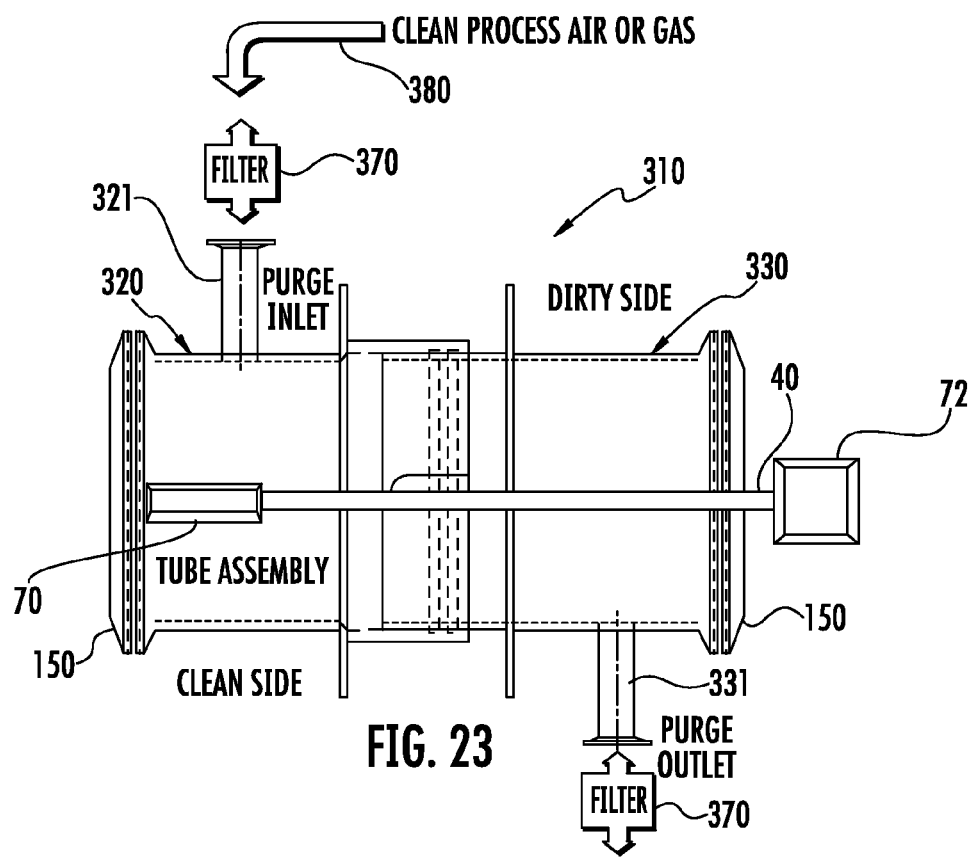

FIG. 23 shows the removal process for the tube 40 after the transfer is complete. Here, the end of the tube 40 on the Clean Side is capped or heat sealed. With the process air source 380 on, the clean Side clamp plate 150 and associated gasket are removed, and the tube 40 and attached gasket are placed in the chamber. A clamp plate 150, which can be solid, and an associated non-perforated gasket 244 are then re-installed to close off the Clean Side.

Figure 24:
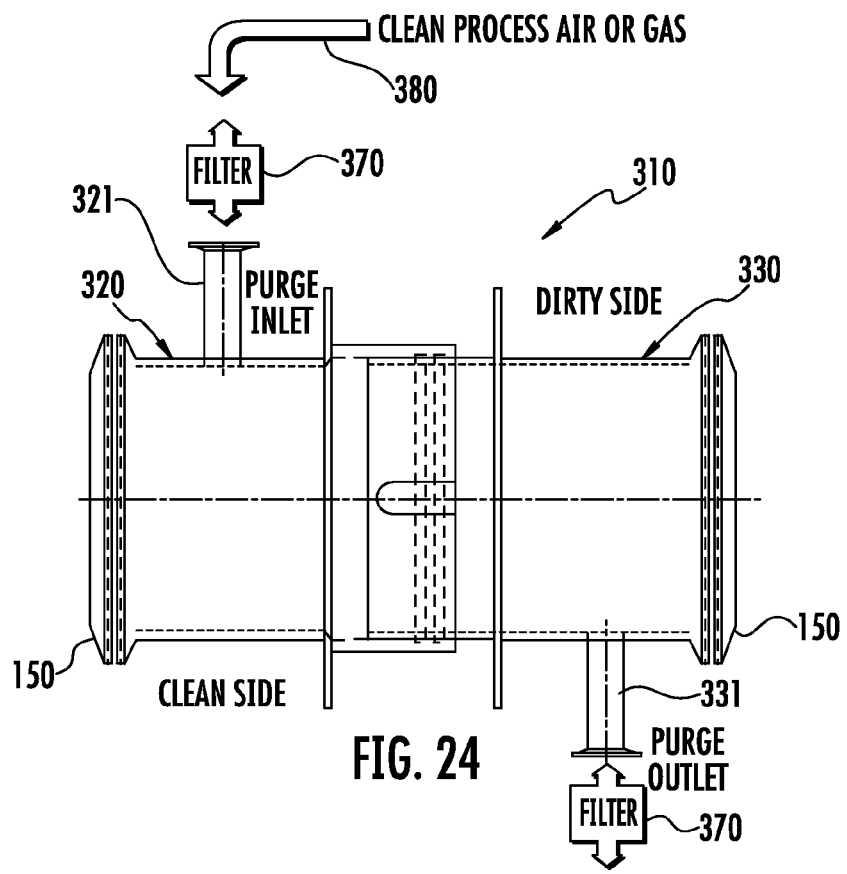

FIG. 24 shows the Dirty Side clamp plate 150 being removed, so that the used tube assembly 40 along with the associated gaskets attached to it are removed. A clamp plate 150, which can be solid, and an associated non-perforated gasket 244 are then re-installed to close off the Dirty Side.

Figure 25:
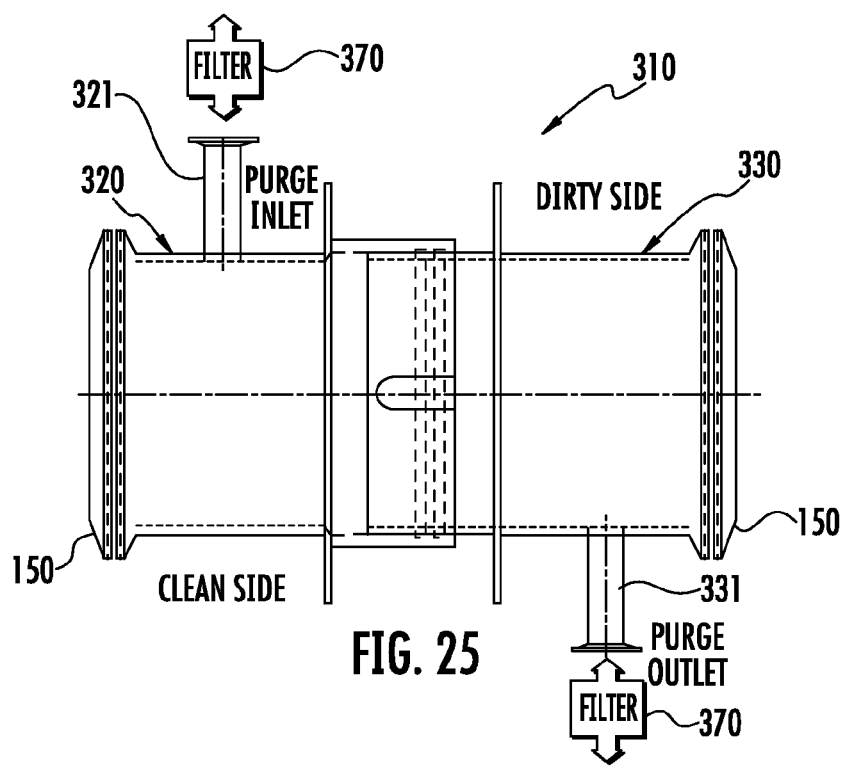

FIG. 25 shows the wall pass-through system 310 back at the initial state and the process air source 380 is turned off or disconnected.

The pass-through system 10, 110, 210, 310 provides a sealed pass-through which can be used in connection with chemical, bio and pharma processing applications where material flow in to or out from a clean room or processing environment through single-use silicone or thermoplastic tubes 40. The system 10, 110, 210, 310 ensures that any material that is exposed is contained within the room or area delimited via the wall 12 and/or prevents contaminants from entering into the area. When not in use, end caps (not shown) can be applied to the clamping flanges 28, 38; 128, 138; 228, 238; 328, 338 on the first and second fixed wall parts 20, 30; 120, 130; 220, 230; 320, 330 using clamps 60. Additionally, the invention provides for use of the arrangement 10, 110, 210, 310 as a sealable pass-through box for allowing any materials to be passed into or out of the clean room through the pass-through assemblies.

While the present invention has been described in terms of the preferred embodiment shown, those skilled in the art will recognize that other variations and modifications can be made which fall within the scope of the present invention.

What is claimed is:

1. A single use wall pass-through system, comprising
first and second fixed wall parts which can be attached through an opening in a wall, with each of the first and second fixed wall parts including a respective tubular body with a mounting flange for connection to the wall, a connection is provided between the tubular bodies within the wall, the mounting flanges are adapted to be attached to respective sides of the wall around the opening, each of the fixed wall parts further includes a clamping flange, a hose or tube is arranged through the tubular bodies of the fixed wall parts and passes through an opening in a gasket, and a clamp ring clamps the gasket between the clamping flange on at least one of the fixed wall parts and a clamp plate, wherein the tube or hose and the gasket are single use,
wherein the gasket is formed with clamping beads that extend around a periphery on each side of the gasket, and the clamp plate and clamping flange each include a corresponding groove.

2. The system of claim 1, wherein the connection between the tubular bodies is a threaded sleeve that engages threads on facing ends of the tubular bodies.

3. The system of claim 1, wherein the connection between the tubular bodies is a slip fit coupling.

4. The system of claim 3, wherein an adhesive or sealant is provided between the slip fit coupling and the tubular bodies.

5. The system of claim 1, wherein the connection between the tubular bodies is formed by a slip fit between an inside diameter of a first one of the tubular bodies and an outside diameter of a second one of the tubular bodies.

6. The system of claim 1, wherein the gasket is cut from a sheet of silicone or a thermoplastic material.

7. The system of claim 6, wherein the gasket is adhered or sealed to the hose or tube about the opening in the gasket.

8. The system of claim 1, wherein the hose or tube fits in the opening in the gasket with an interference fit.

9. The system of claim 1, wherein the clamp plate and the clamping flange each include a beveled peripheral edge that is engaged by the clamping ring.

10. The system of claim 1, wherein a plurality of the openings are located in the gasket, and a corresponding plurality of the hoses or tubes are provided, with one of the hoses or tubes extending through each of the openings.

11. A single use wall pass-through system, comprising
first and second fixed wall parts which can be attached through an opening in a wall, with each of the first and second fixed wall parts including a respective tubular body with a mounting flange for connection to the wall, a connection is provided between the tubular bodies within the wall, the mounting flanges are adapted to be attached to respective sides of the wall around the opening, each of the fixed wall parts further includes a clamping flange, a hose or tube is arranged through the tubular bodies of the fixed wall parts and passes through an opening in a gasket, and a clamp ring clamps the gasket between the clamping flange on at least one of the fixed wall parts and a clamp plate, wherein the tube or hose and the gasket are single use, the connection between the tubular bodies is a slip fit coupling, and at least one o-ring is located between the inside diameter of the first tubular body and the outside diameter of the second tubular body.

12. A single use wall pass-through system, comprising
first and second fixed wall parts which can be attached through an opening in a wall, with each of the first and second fixed wall parts including a respective tubular body with a mounting flange for connection to the wall, a connection is provided between the tubular bodies within the wall, the mounting flanges are adapted to be attached to respective sides of the wall around the opening, each of the fixed wall parts further includes a clamping flange, a hose or tube is arranged through the tubular bodies of the fixed wall parts and passes through an opening in a gasket, and a clamp ring clamps the gasket between the clamping flange on at least one of the fixed wall parts and a clamp plate, wherein the tube or hose and the gasket are single use, and a gasket without an opening is clamped between one of the clamping flanges and the clamp plate to provide a sealed cover on one side of the wall.

13. A single use wall pass-through system, comprising
first and second fixed wall parts which can be attached through an opening in a wall, with each of the first and second fixed wall parts including a respective tubular body with a mounting flange for connection to the wall, a connection is provided between the tubular bodies within the wall, the mounting flanges are adapted to be attached to respective sides of the wall around the opening, each of the fixed wall parts further includes a clamping flange, a hose or tube is arranged through the tubular bodies of the fixed wall parts and passes through an opening in a gasket, and a clamp ring clamps the gasket between the clamping flange on at least one of the fixed wall parts and a clamp plate, wherein the tube or hose and the gasket are single use, and the hose or tube is made of silicone or a thermoplastic material the gasket is made from silicone or a thermoplastic material, and is connected to the hose using silicone or an adhesive of chemical bond.

14. A method of connecting a hose through a single-use wall pass-through system, comprising:
removing a clamp plate installed on a clean side of a wall pass-through chamber defined by first and second tubular bodies connected to clamping flanges that are attached on either side of a wall through an opening between the clean side and a dirty side, with the first and second tubular bodies being connected together in a sealed manner within the opening;
installing the tube through a hole or opening in a gasket on the clean side, such that the tube is connected to the clean side gasket in a sealed manner gasket;
placing an end of the tube which is closed off into an inside of the wall pass-through chamber;
re-installing the clean side clamp plate over the gasket on the tube on the clean side so that the end of the tube is sealed in the chamber;
pressurizing the chamber with process air from a process air source;
removing a clamp plate from the dirty side;
pulling the tube into the dirty side;

installing the tube through a hole or opening in a gasket on the dirty side such that the tube is connected to the dirty side gasket in a sealed manner gasket;

re-installing the dirty side clamp plate over the gasket on the tube on the dirty side so that the end of the tube extends out through the dirty side gasket.

15. The method of claim 14, further comprising:

installing air filters on inlet and outlet purge tubes connected to the first and second tubular bodies;

and providing clean process air to at least the inlet purge tube prior to removing the dirty side clamp plate.

16. The method of claim 14, further comprising:

wiping down the chamber with a cleaner and/or disinfectant after removal of the clean side clamp plate.

17. The method of claim 14, further comprising:

after transfer of material through the tube, sealing a clean side end of the tube;

removing the clean side clamp plate, and placing the tube and the clean side gasket in the chamber;

installing a sealed clamp plate on the clean side of the wall pass-through chamber;

removing the dirty side clamp plate, and removing the tube along with the associated gasket; and installing a sealed clamp plate on the dirty side of the wall pass-through chamber.

* * * * *

UNITED STATES PATENT AND TRADEMARK OFFICE
CERTIFICATE OF CORRECTION

PATENT NO. : 8,870,230 B2  Page 1 of 1
APPLICATION NO. : 13/853392
DATED : October 28, 2014
INVENTOR(S) : Kenneth Bibbo It is certified that error appears in the above-identified patent and that said Letters Patent is hereby corrected as shown below:

ON THE TITLE PAGE

Item "(72) Inventor:", delete "Keneth" and insert therefore -- Kenneth --.

IN THE SPECIFICATION

At column 8, line 31, after the word "gasket", delete "224 I" and insert therefore -- 224 --.

Signed and Sealed this
Fourteenth Day of April, 2015

Michelle K. Lee
*Director of the United States Patent and Trademark Office*